Feb. 20, 1962 T. H. SLOAN 3,021,648

METHOD AND APPARATUS FOR HONING ANNULAR BODIES

Filed Nov. 23, 1959 13 Sheets-Sheet 1

INVENTOR.
Theodore H. Sloan
BY William B. Jaspert
Attorney.

METHOD AND APPARATUS FOR HONING ANNULAR BODIES

Filed Nov. 23, 1959 13 Sheets-Sheet 2

INVENTOR.
Theodore H. Sloan
BY William B. Jaspert
Attorney.

Feb. 20, 1962 T. H. SLOAN 3,021,648

METHOD AND APPARATUS FOR HONING ANNULAR BODIES

Filed Nov. 23, 1959 13 Sheets-Sheet 3

INVENTOR.
Theodore H. Sloan
BY William D. Jaspert
Attorney

INVENTOR.
Theodore H. Sloan
BY William B Jaspert
Attorney.

Feb. 20, 1962 T. H. SLOAN 3,021,648

METHOD AND APPARATUS FOR HONING ANNULAR BODIES

Filed Nov. 23, 1959 13 Sheets-Sheet 5

INVENTOR.
Theodore H. Sloan
BY William B. Jaspert
Attorney.

Feb. 20, 1962 T. H. SLOAN 3,021,648

METHOD AND APPARATUS FOR HONING ANNULAR BODIES

Filed Nov. 23, 1959 13 Sheets-Sheet 6

INVENTOR.
Theodore H. Sloan
BY William B. Jaspert
Attorney.

Feb. 20, 1962 T. H. SLOAN 3,021,648

METHOD AND APPARATUS FOR HONING ANNULAR BODIES

Filed Nov. 23, 1959 13 Sheets-Sheet 7

INVENTOR.
Theodore H. Sloan
BY William B. Jaspert
Attorney

METHOD AND APPARATUS FOR HONING ANNULAR BODIES

Filed Nov. 23, 1959 13 Sheets-Sheet 8

INVENTOR.
Theodore H. Sloan
BY William B. Jaspert
Attorney.

Feb. 20, 1962 T. H. SLOAN 3,021,648

METHOD AND APPARATUS FOR HONING ANNULAR BODIES

Filed Nov. 23, 1959 13 Sheets-Sheet 9

INVENTOR.
Theodore H. Sloan
BY William B. Jaspert
Attorney

Feb. 20, 1962 T. H. SLOAN 3,021,648

METHOD AND APPARATUS FOR HONING ANNULAR BODIES

Filed Nov. 23, 1959 13 Sheets-Sheet 10

INVENTOR.

Theodore H. Sloan

BY William B. Jaspert

Attorney.

INVENTOR.
Theodore H. Sloan
BY William B. Jaspert
Attorney.

INVENTOR.
Theodore H. Sloan
BY William B. Jaspert
Attorney.

INVENTOR.
Theodore H. Sloan
BY William D Jaspert
Attorney.

United States Patent Office 3,021,648 Patented Feb. 20, 1962

3,021,648

METHOD AND APPARATUS FOR HONING ANNULAR BODIES

Theodore H. Sloan, P.O. Box 58, Charleroi, Pa., assignor of one-fourth to William B. Jaspert, Upper St. Clair Township, Pa.

Filed Nov. 23, 1959, Ser. No. 854,740
13 Claims. (Cl. 51—135)

Figures 1, 2:
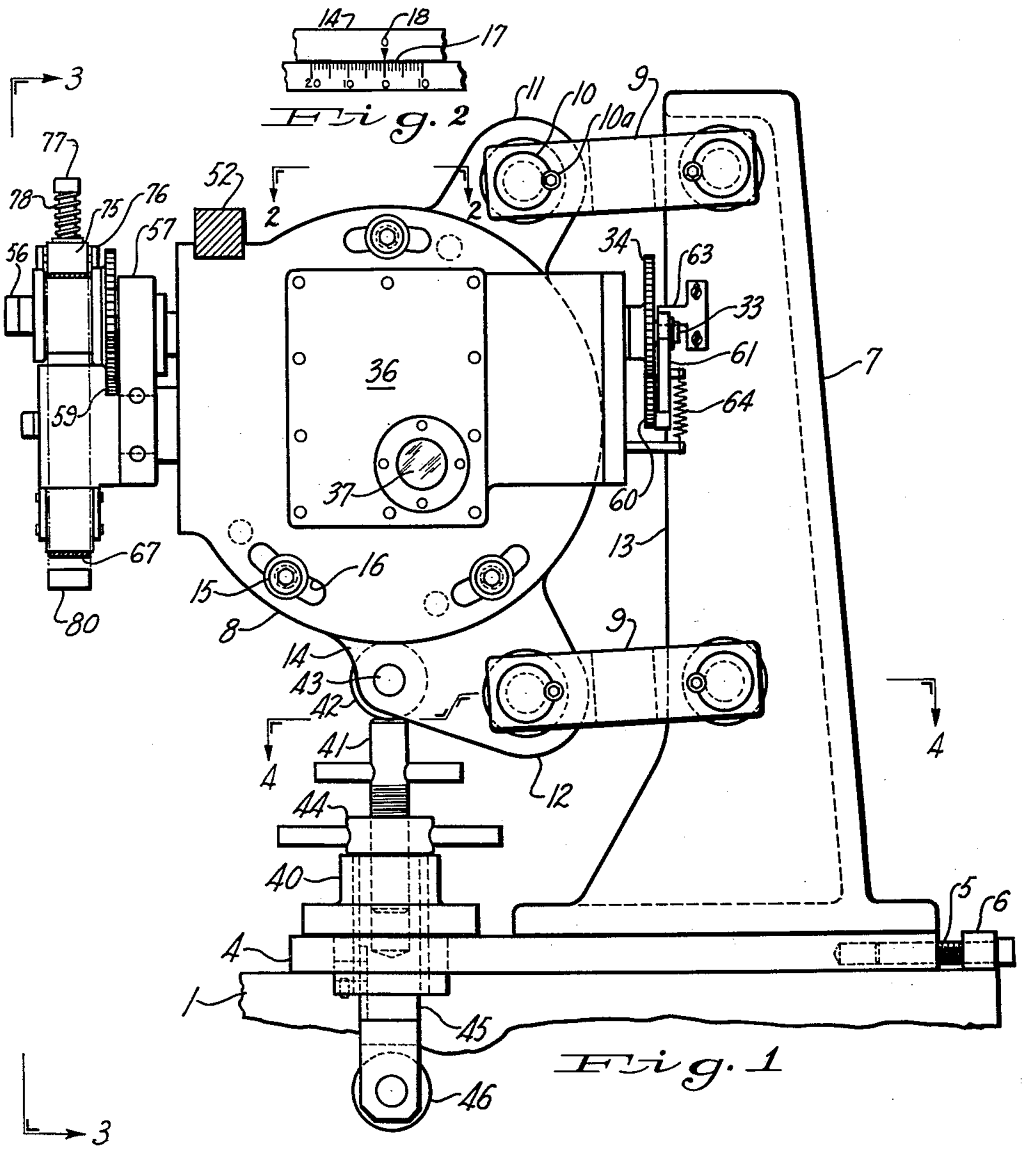

This invention relates to new and useful improvements in method of and apparatus for honing cylindrical bodies, as for example, rollers for roller bearings or the like, and the present invention is a continuation-in-part of an application that has matured as United States Letters Patent 2,938,308 granted May 31, 1960.

In my afore-mentioned patent, I have disclosed a method of feeding a strip of abrasive faced tape from a supply roll to a honing shoe that applies the abrasive surface to the surfce of the work to be honed and feeding said strip of abrasive material or honing tape in increments between successive honing applications. The present apparatus makes use of such honing tape feed mechanism and in addition provides special equipment adapted for the application of such honing tape abrasive surfaces to the cylindrical bodies and the end of said bodies either separately or simultaneously and it is among the objects of this invention to provide special apparatus for feeding, mounting and driving cylindrical bodies for the application of the honing abrasive to one or more surfaces thereof.

It is a further object of the invention to feed cylindrical bodies to be honed down an inclined chute by gravity to a position where it is acted upon by a plunger which pushes it to a honing station between a pair of drive rolls.

It is further object of the invention to provide feed mechanism of the above-designated character which prevents clogging of the feed paths and the work supporting areas by yieldingly mounting the feeder operating parts to avoid breakage or jamming.

It is still a further object of the invention to provide a roll support and feed mechanism of the above-designated character in which a plurality of work supporting rolls also constitute the drive for revolving the cylindrical body to be honed at high speed and in which said rolls are periodically separated to allow the finished work piece to drop out of its supported position while a new piece to be honed is fed to the honing position.

It is still a further object of the invention to provide a honing head which consists of a shuttle bar and a combined guide bar and feed mechanism which shall be subjected to cyclic movement timed with the feeding of the work pieces to the honing position and in which the shuttle bar carrying the honing shoe is subjected to rapid oscillations to effect the honing action on the revolving surface or surfaces to be honed.

The invention further contemplates the improvement of the honing head of the above-designated character which is mounted to be tiltable to adapt the honing shoe to the inclination of the surface to be honed, and which is provided with means for mounting guide rolls and feed mechanisms for guiding and feeding the abrasive tape to and from the honing shoe in response to movement of the honing head.

A further object of the invention is to provide a tape feeding mechanism which is adapted to apply an abrasive tape to one end of the work piece being honed while at the same time another honing action is taking place by a separate abrasive tape acting on another portion such as the main cylindrical body of the work piece.

It is still a further object of the invention to provide cam and transmission mechanisms for coordinating the work feeding, tape feed, honing head and shuttle bar movements at proper speeds and in proper timed relation and it is still a further object of the invention to provide adjusting mechanism for regulating the pressure acting on the honing shoe and to provide a honing shoe designed to have the pressure points offset from the tape tracking serrations of the shoe.

Another object of the invention is to provide a pinch roll drive for the rollers to be honed in which the drive rollers automatically engage and release the article to be honed and subject it to a true rotary motion during the honing action.

Figures 3, 6, 19, 20:
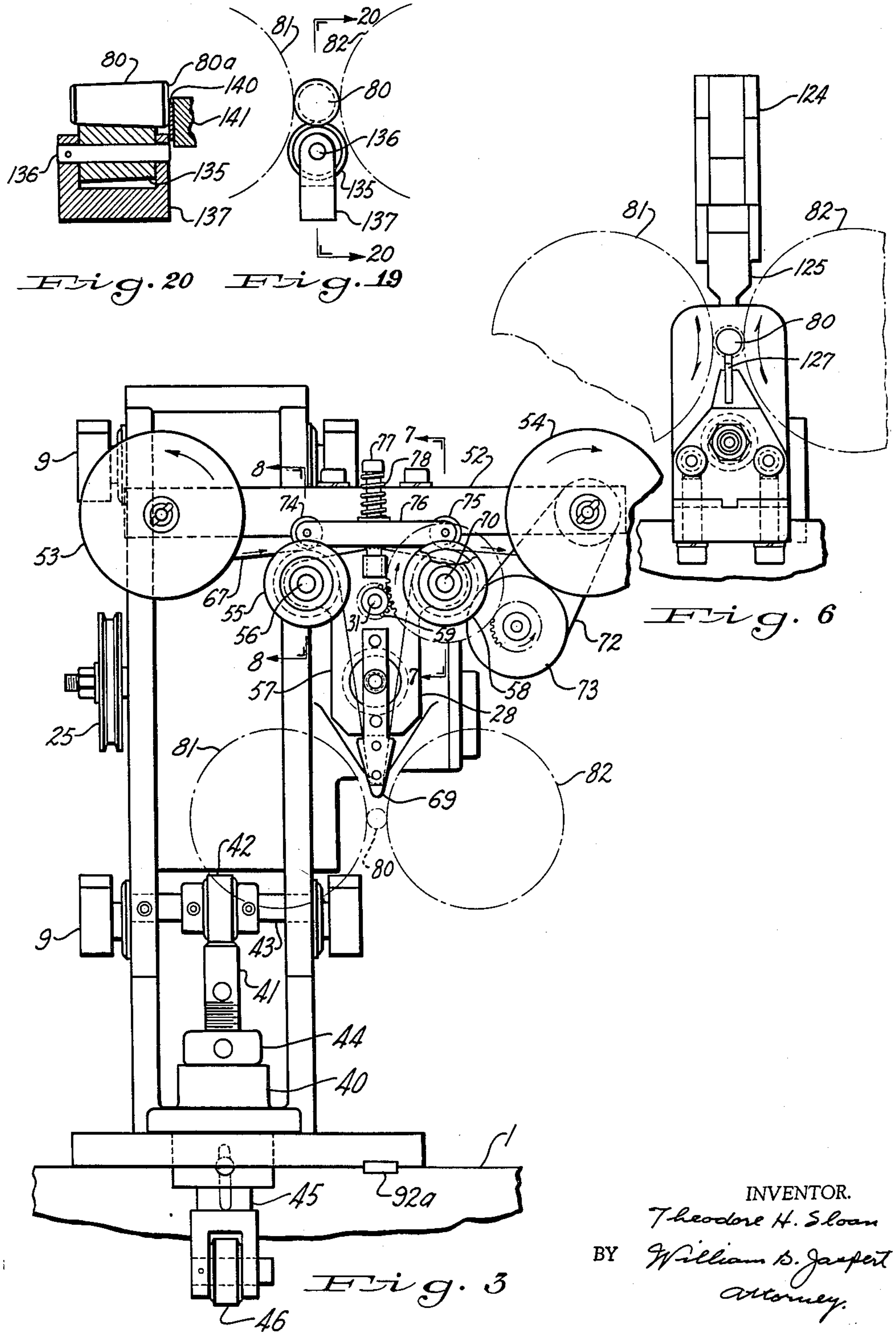
Figure 4:
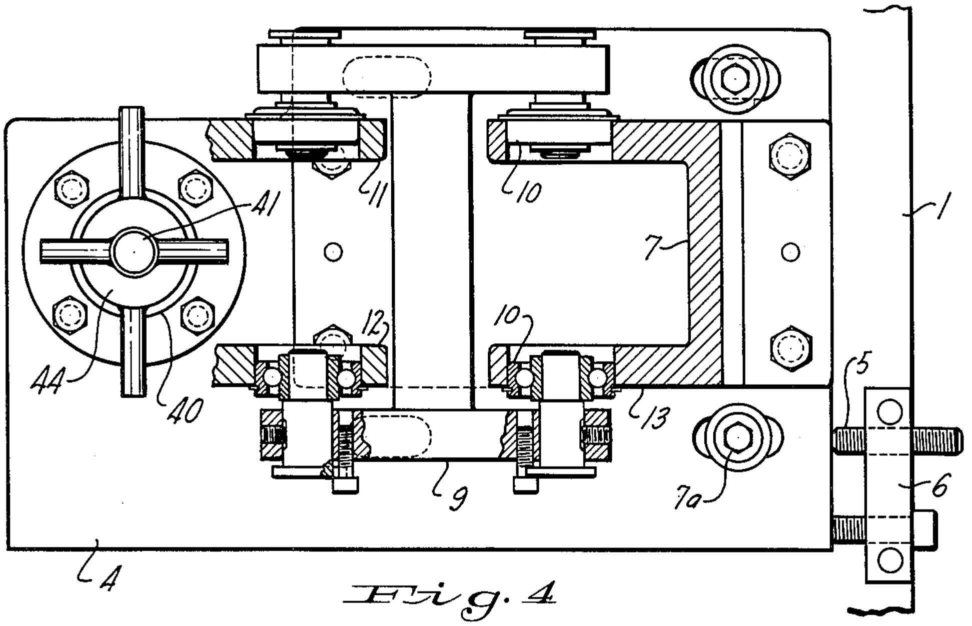
Figure 13:
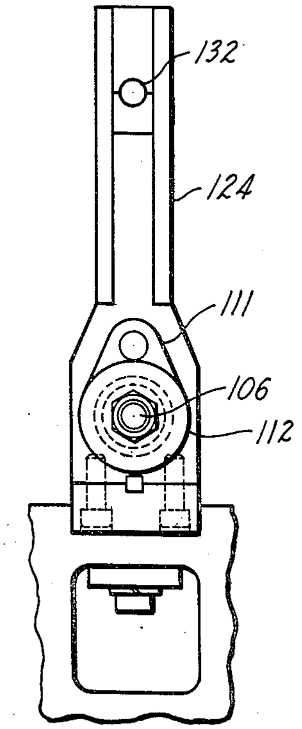
Figure 11:
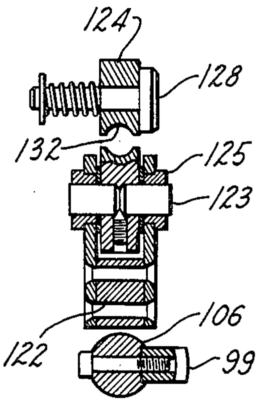
Figure 12:
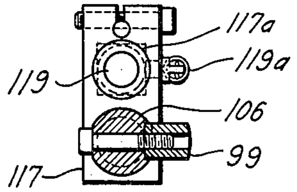
Figure 16:
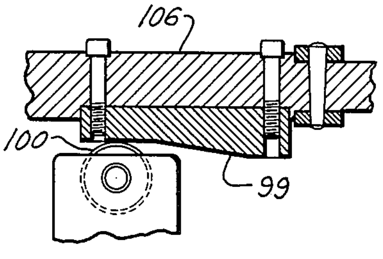
Figure 15:
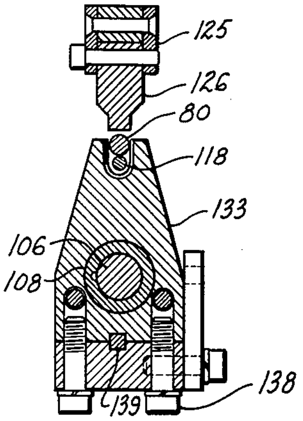
Figure 14:
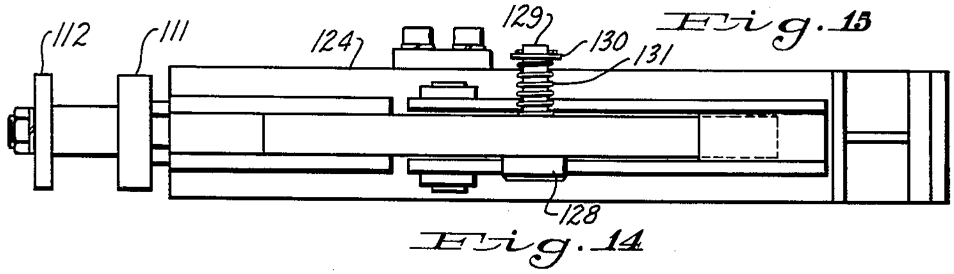
Figure 5:
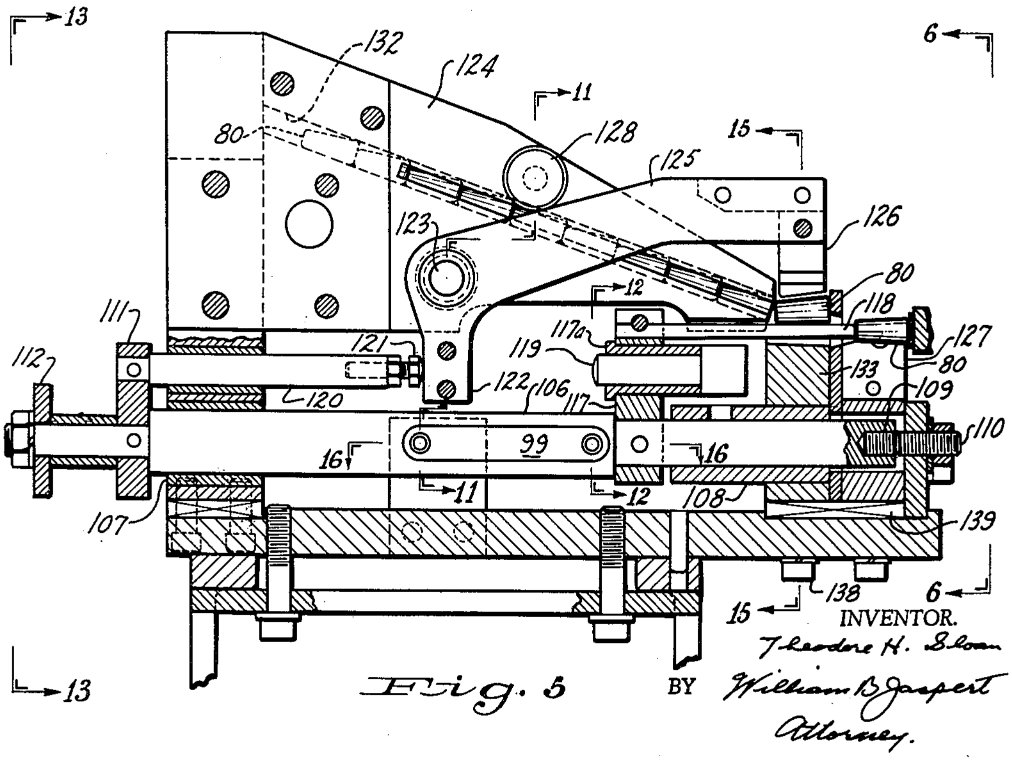
Figure 9:
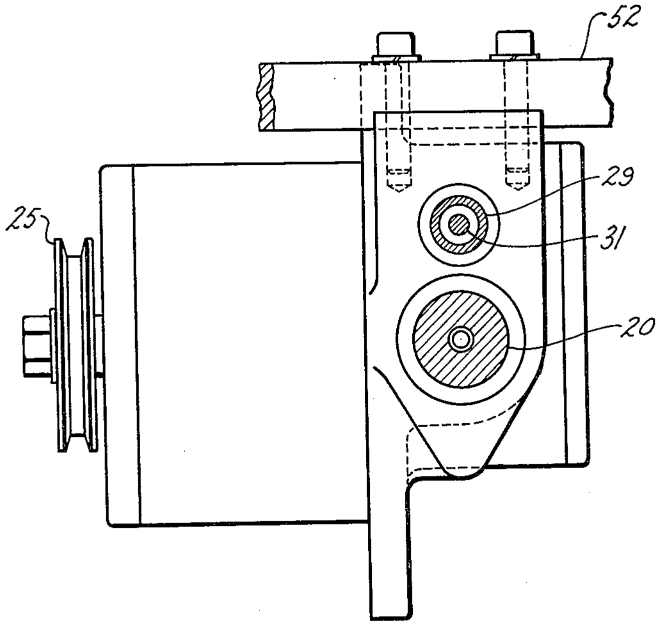
Figure 8:
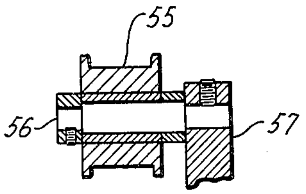
Figure 7:
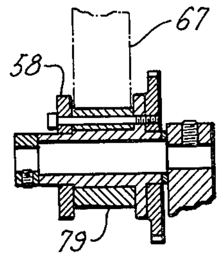
Figure 10:
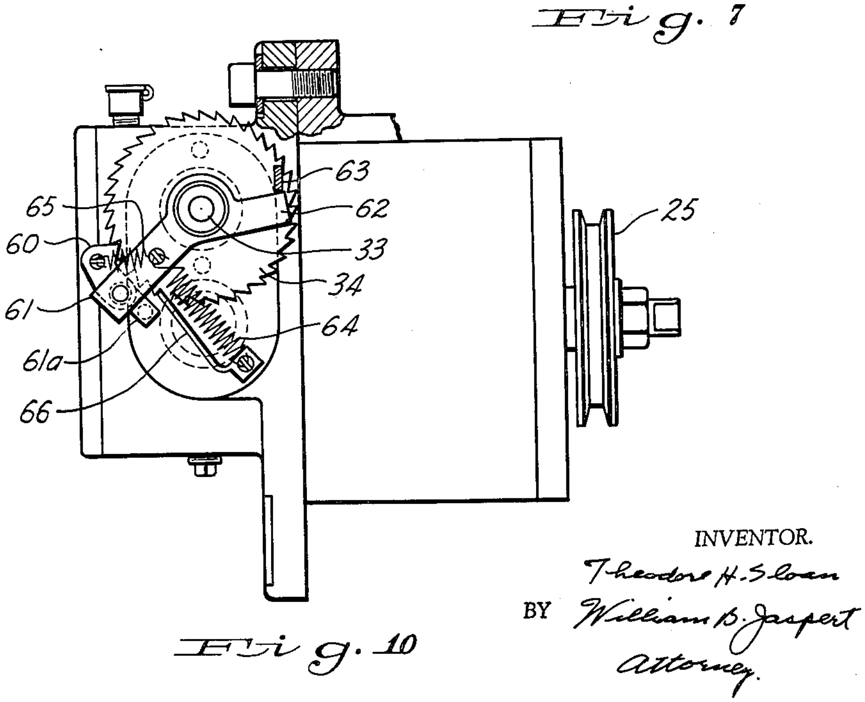
Figures 17, 18:
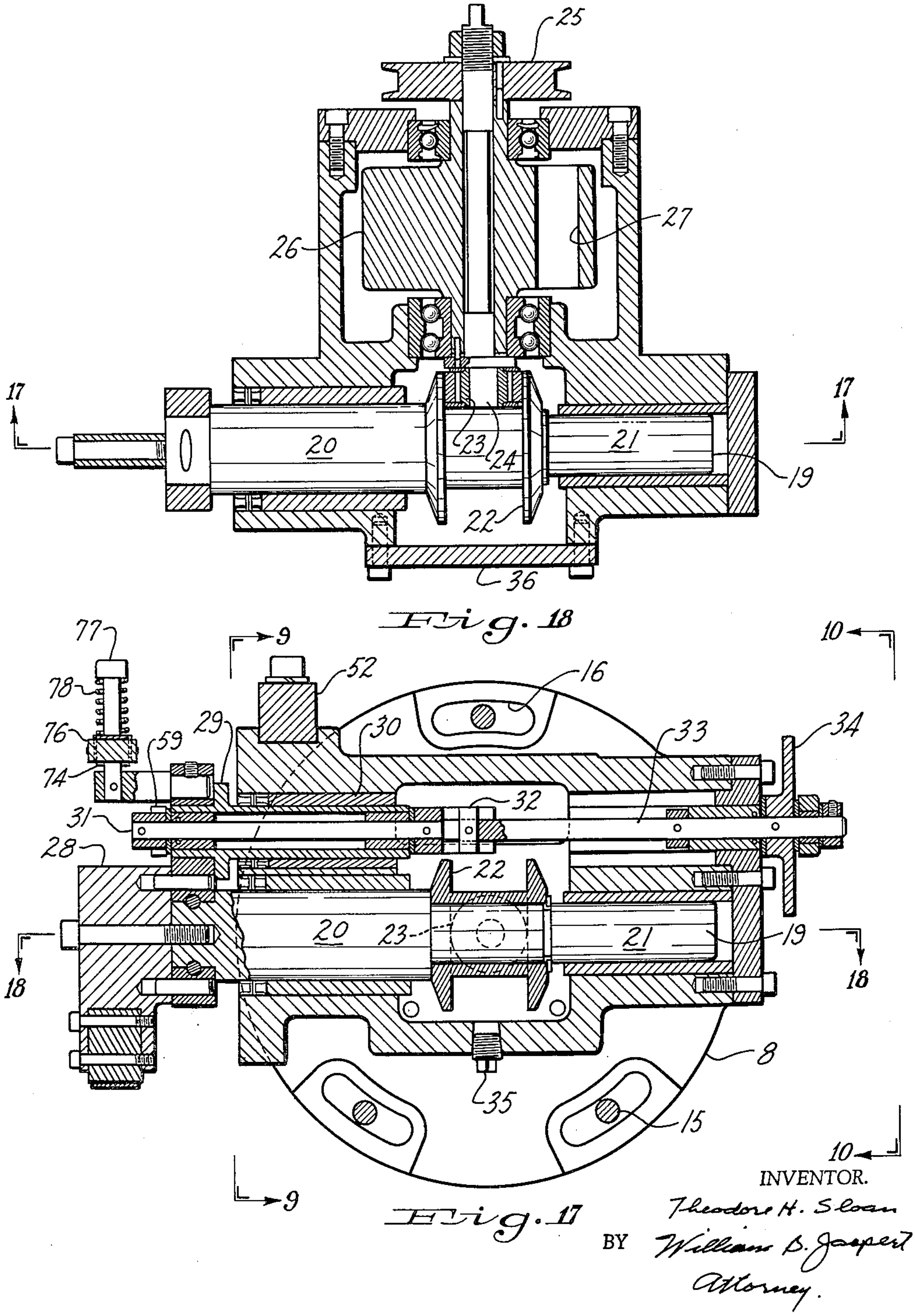
Figures 21, 22, 23:
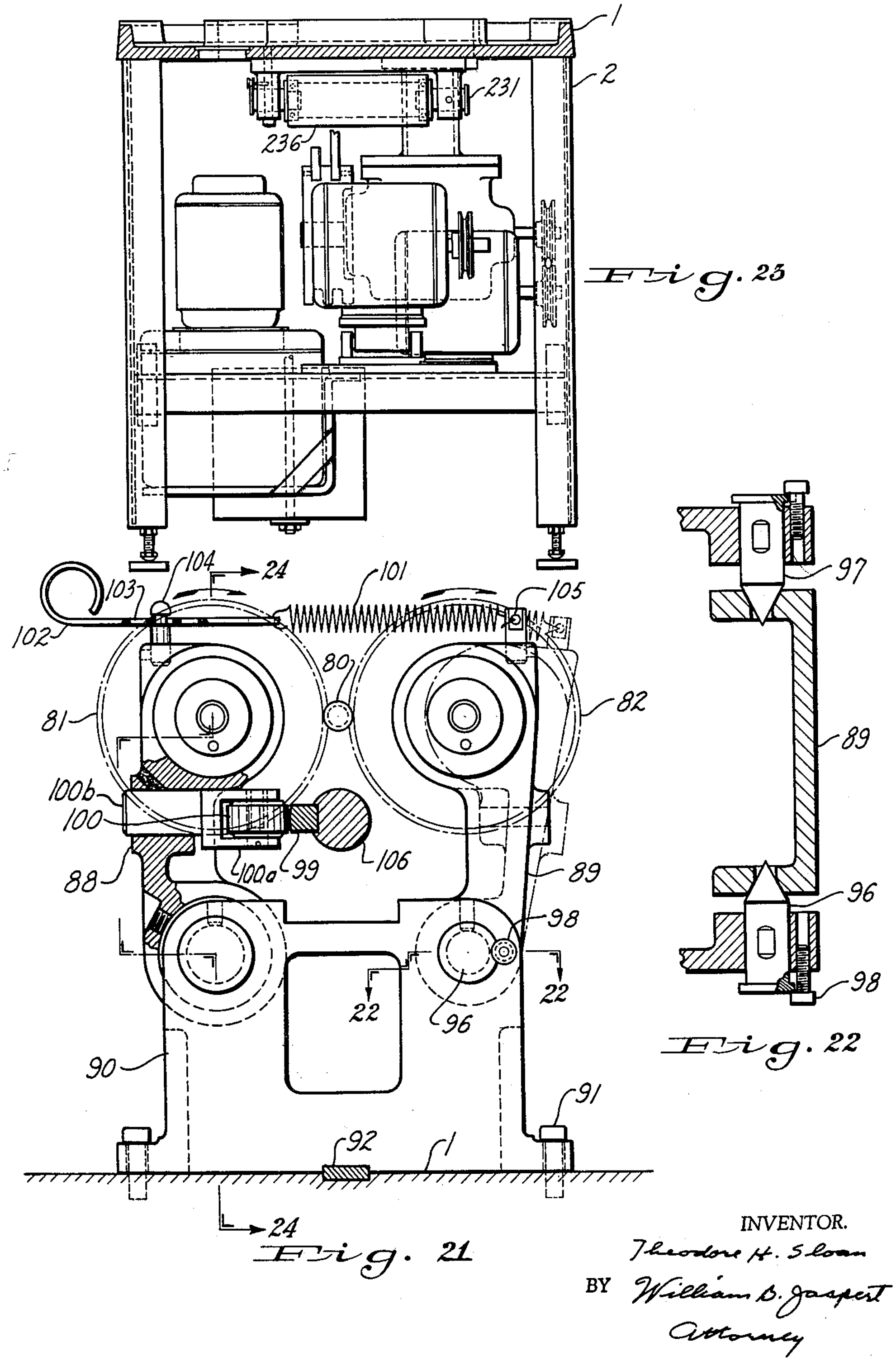
Figure 25:
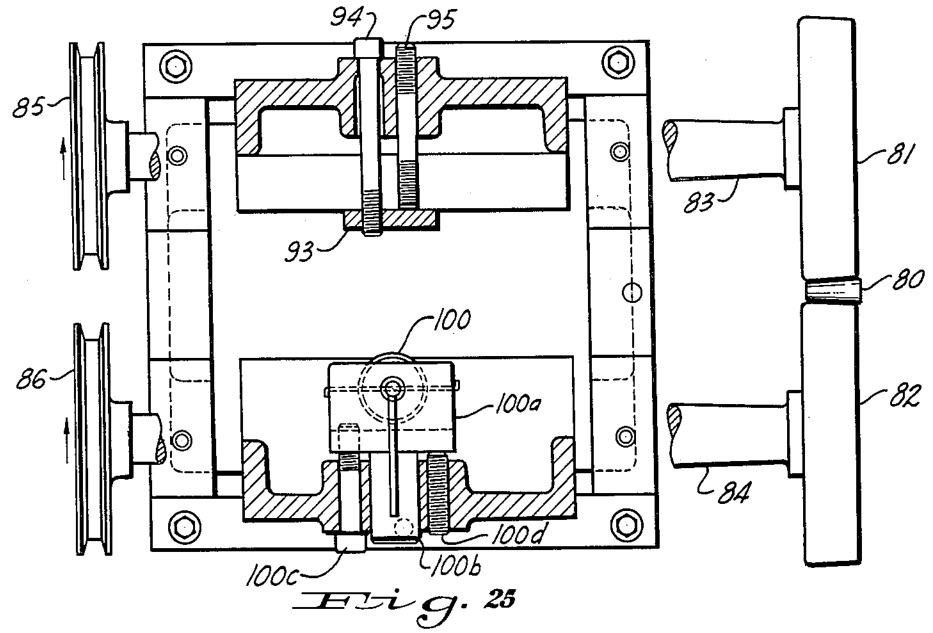
Figure 24:
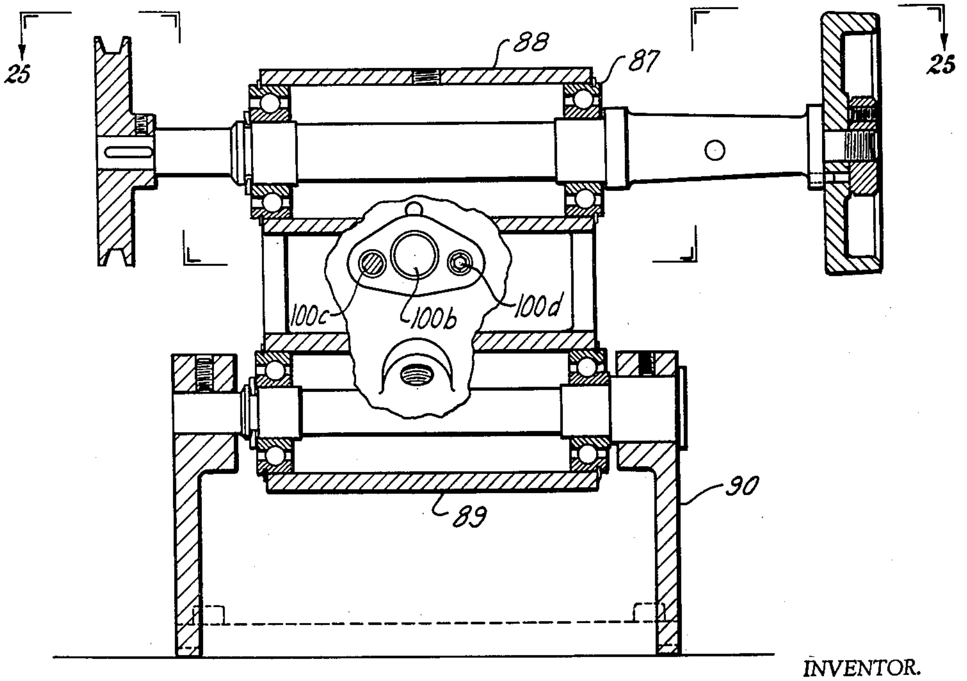
Figure 27:
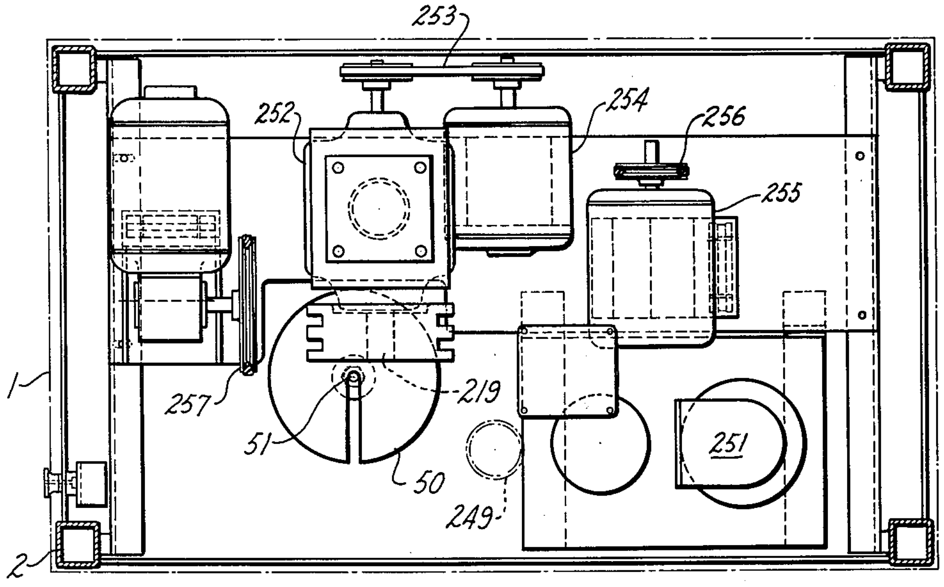
Figure 26:
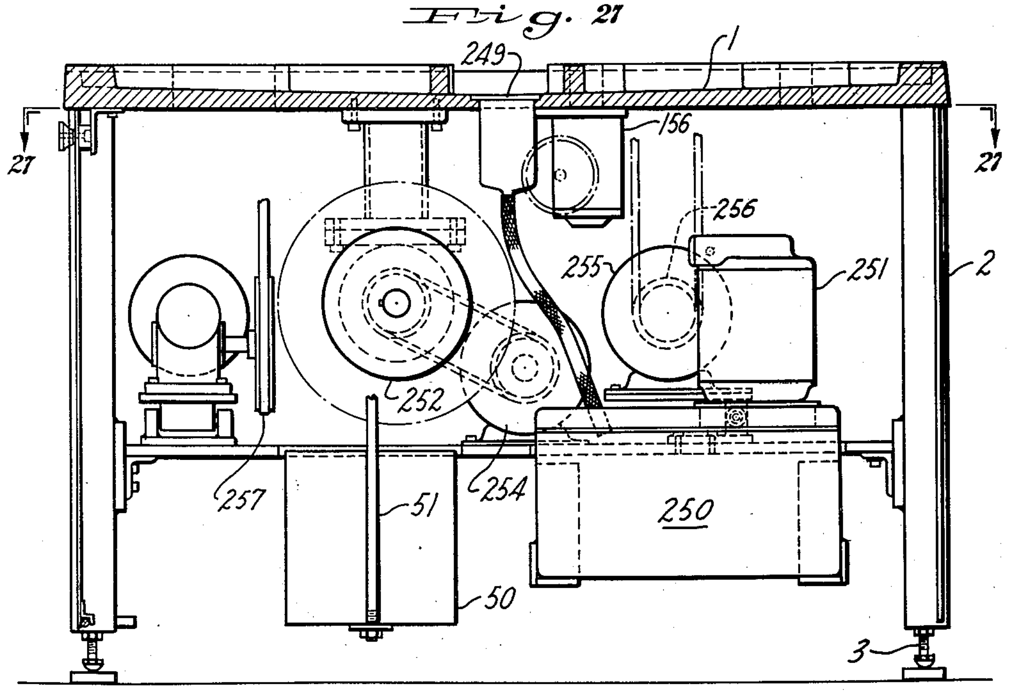
Figures 28, 29, 30, 31, 32:
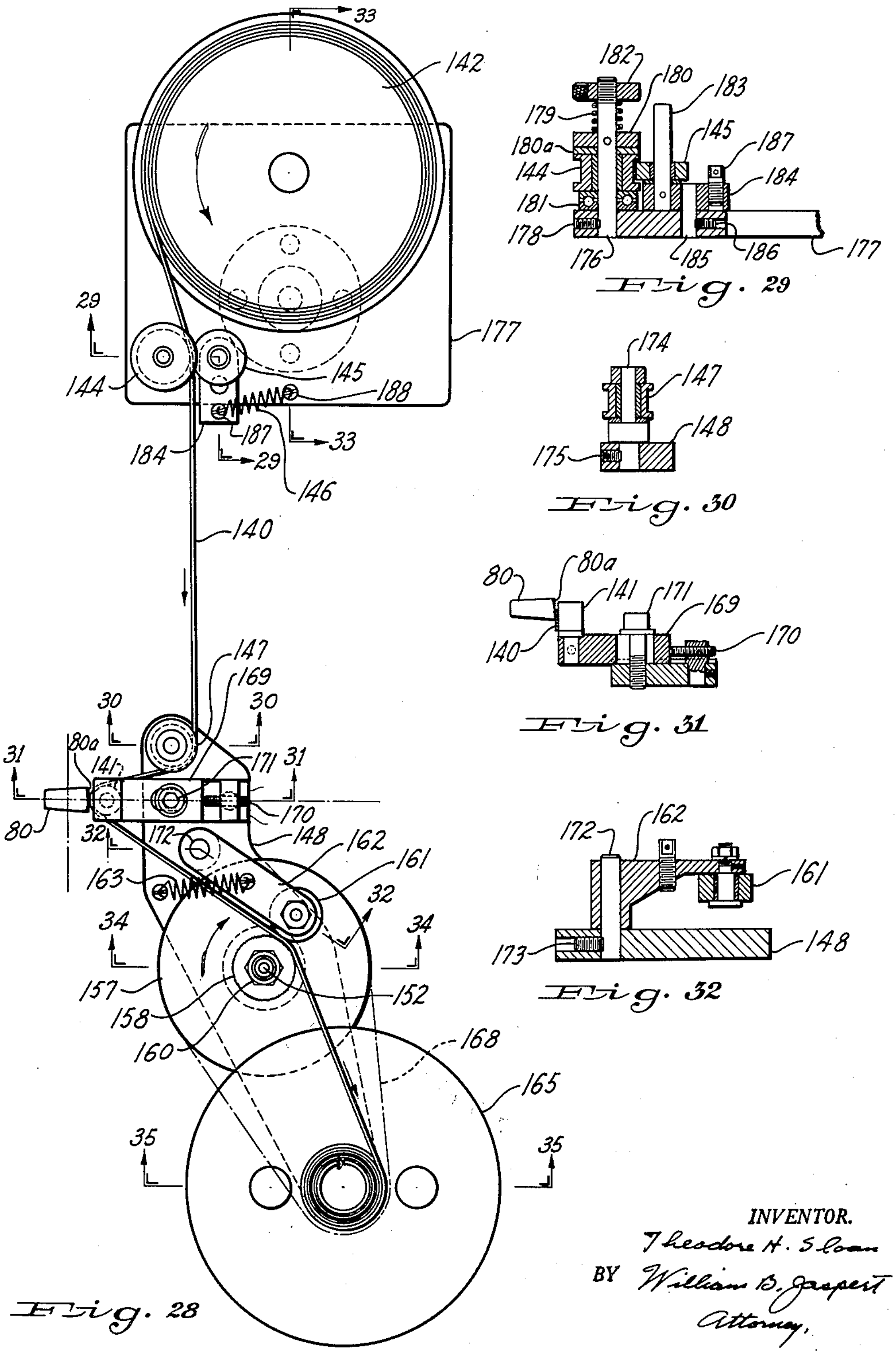
Figure 35:
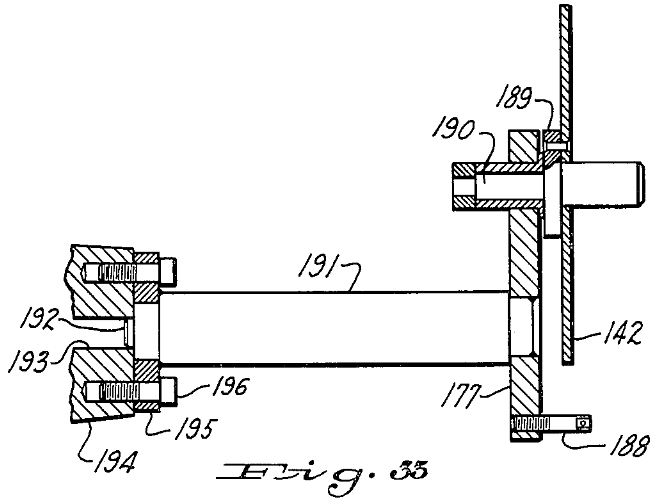
Figure 36:
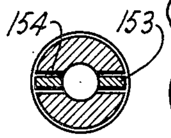
Figure 34:
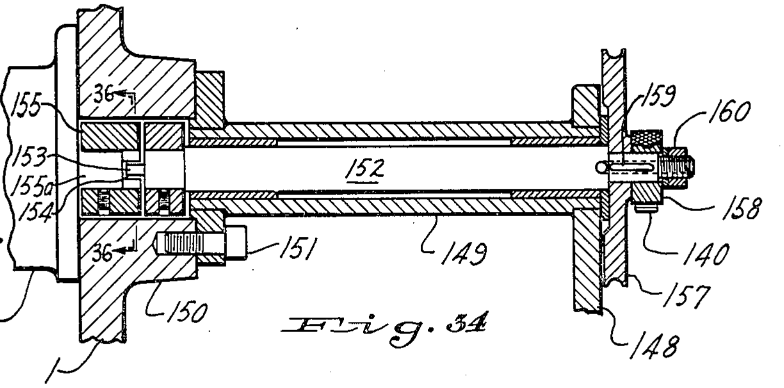
Figure 35:
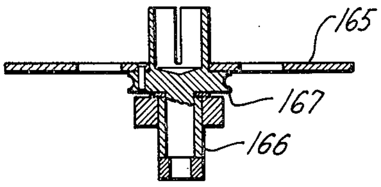
Figures 37, 39, 40, 41, 42, 43:
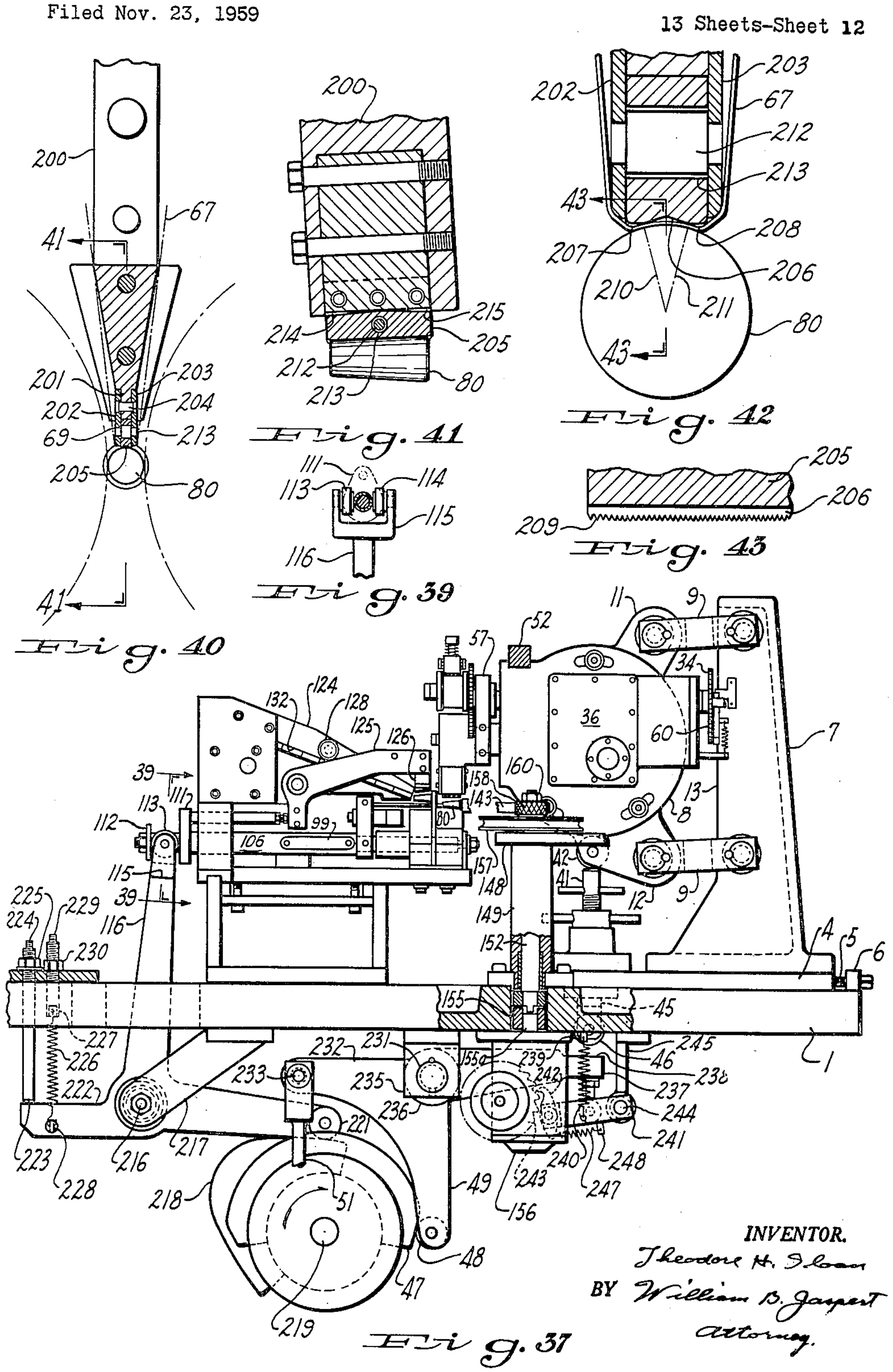
Figure 38:
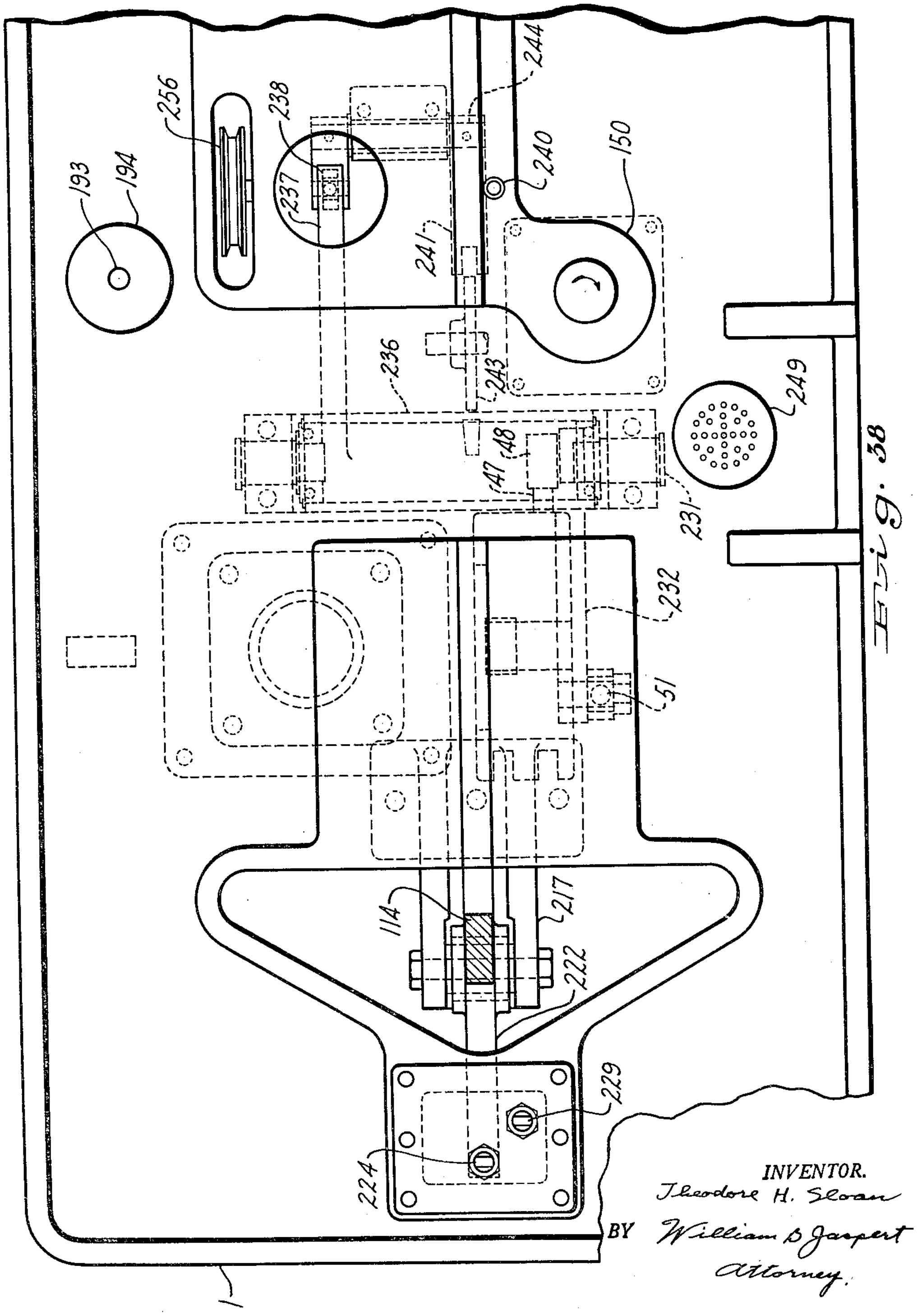

These and other objects of the invention will become more apparent from a consideration of the accompanying drawings constituting a part hereof in which like reference characters designate like parts and in which:

FIGURE 1 is a side elevational view of a tape honing machine head and support embodying the principles of this invention;

FIGURE 2, a top plan view taken along the line 2—2, FIGURE 1, showing the graduations to determine the degree of tilt of the honing head on its support;

FIGURE 3, a front elevational view of the honing head and honing shoe diagrammatically illustrating its relation to the work being honed such as cylindrical rollers and their driving support rolls;

FIGURE 4, a plan view partially in section taken along the line 4—4, FIGURE 1;

FIGURE 5, a side elevational view, partially in section, of the roller support and feed mechanism;

FIGURE 6, a front elevational view of the honer feed mechanism taken along the line 6—6, FIGURE 5;

FIGURE 7, a vertical section taken along the line 7—7, FIGURE 3;

FIGURE 8, a vertical section taken along the line 8—8, FIGURE 3;

FIGURE 9, a sectional elevational view of the honing head taken along the line 9—9, FIGURE 17;

FIGURE 10, a rear end view of the honing head taken along the line 10—10, FIGURE 17;

FIGURE 11, a vertical section taken along the line 11—11, FIGURE 5;

FIGURE 12, a sectional elevational view taken along the line 12—12, FIGURE 5;

FIGURE 13, a rear elevation of the feed mechanism taken along the line 13—13, FIGURE 5;

FIGURE 14, a top plan view of the roller feed mechanism of FIGURE 5;

FIGURE 15, a vertical section of the feed mechanism taken on the line 15—15 of FIGURE 5;

FIGURE 16, a cross-section taken along the line 16—16, FIGURE 5;

FIGURE 17, a vertical section of the honing head taken along the line 17—17, FIGURE 18;

FIGURE 18, a transverse section, partially in elevation, of the honing head taken along the line 18—18, FIGURE 17;

FIGURE 19, a front elevation of a roller support for the roll to be honed diagrammatically illustrating the drive wheels therefor;

FIGURE 20, a vertical section partially in elevation taken along the line 20—20, FIGURE 19;

FIGURE 21, a front elevational view, partially in section, of the roller feed and drive mechanism;

FIGURE 22, a cross section taken along the line 22—22, FIGURE 21;

FIGURE 23, a rear elevational view of the honing machine base and supporting frame structure showing the drive and transmission elements in elevation;

FIGURE 24, a vertical section, partially in elevation, taken along the line 24—24, FIGURE 21;

FIGURE 25, a horizontal section, partially in elevation, taken along the line 25—25, FIGURE 24;

FIGURE 26, a side elevational view of the honing machine base and supporting frame structure showing motor drive transmission and pump mechanism in elevation;

FIGURE 27, a top plan view of the machine frame and drive elements taken along the line 27—27, FIGURE 26;

FIGURE 28, a top plan view of a honing tape feed and guide mechanism for honing the ends of the rollers;

FIGURE 29, a section taken along the line 29—29, top of FIGURE 28;

FIGURE 30, a cross section taken along the line 30—30 at the center of FIGURE 28;

FIGURE 31, a cross section, partially in elevation, taken along the line 31—31, FIGURE 28;

FIGURE 32, a section taken along the line 32—32, FIGURE 28;

FIGURE 33, a cross section, partially in elevation, taken along the line 33—33, top of FIGURE 28;

FIGURE 34, a section taken along the line 34—34, FIGURE 28;

FIGURE 35, a section taken along the line 35—35, FIGURE 28;

FIGURE 36, an end elevation taken along the line 36—36, FIGURE 34;

FIGURE 37, a side elevational view, partially in section, showing a portion of the base, the work support, the feed actuating cam mechanism, the honing head operating mechanism and a portion of the tape feed mechanism assembly;

FIGURE 38, a top plan view of the machine base shown in FIGURE 37;

FIGURE 39, a cross section, partially in elevation, taken on the line 39—39, FIGURE 37;

FIGURE 40, an enlarged detail of the honing shoe support, partially in section;

FIGURE 41, a cross-sectional view thereof taken along the line 41—41, FIGURE 40;

FIGURE 42, an enlarged detail of a cross section of the shoe; and

FIGURE 43, a section of the shoe of FIGURE 42 taken along the line 43—43, FIGURE 42.

FIGURE 1 shows a portion of a machine table 1 also shown in FIGURES 26 and 37 that is supported on frames 2 having jack screws 3, FIGURE 26, to adjust the level of the table 1. Mounted on the table 1 is a base 4 adjustable in a horizontal plane by a screw 5 extending through the member 6 and mounted on the base 4 is a solid frame member 7 that is secured to the base 4 in any suitable manner, as by bolts 7*a*, FIGURE 4.

The frame 7 supports a honing head generally designated by the numeral 8 that is connected by links 9 to the supporting frame 7, the links being mounted by preloaded anti-friction bearings 10 in the ears 11 and 12 of the honing head and by similar bearings extending in the walls 13 of the supporting frame 7, all as is more clearly shown in FIGURE 4 of the drawing.

The ears 12 of the honing head are extensions of a plate 14 to which the head shown in FIGURES 17 and 18 is bolted by the screw bolts 15, FIGURE 1, the head 8 having segment slots 16 to allow for angular adjustment of the head on the plate through an angle corresponding to the graduations from zero to 20*a* shown in FIGURE 2 of the drawing and designated by the numeral 17, the zero marker 18 being on the stationary plate 14.

An additional set of three tapped holes 15*a* are provided for the screw bolts 15 so that honing head 8 can be tilted at a greater angle, if desired.

As shown in FIGURES 17 and 18, the honing head consists of a shuttle bar in the form of a cylindrical shaft member 19 having an enlarged end 20 and a reduced bearing end 21, the shuttle bar 19 being subject to oscillatory movement by a yoke 22 that is engaged by an eccentric 23 to drive the same. The eccentric or roller 23 more clearly shown in FIGURE 18, is mounted on the eccentric shaft 24 that is driven by a sheave wheel 25, the shaft being provided by a flywheel 26 to offset the thrust of the eccentric drive to get a smooth action in the oscillatory movement of the shuttle arm 19. The flywheel is bored at 27 to obtain the desired counterbalance.

The shuttle arm 19 is provided with an extension on which is mounted a block 28 that carries the honing tape and honing shoe, as will be hereinafter explained. Mounted in the honing head is a sleeve 29 slidable in bearing 30 in which is mounted a shaft 31 coupled at 32 to a shaft 33, the coupling 32 being of the tongue and groove type to allow for slight relative aligning movement between the shafts 31 and 33. The shaft 33 is provided with a ratchet wheel 34 to subject the shaft and the sleeve 29 to angular movement, as will be hereinafter explained. The yoke 22 and the eccentric drive is contained within a chamber of the honing head that is filled with a suitable lubricant through an opening capped by screw 35, a cover member 36 having a transparent portion 37, FIGURE 1 indicates that the chamber is filled with the lubricating fluid.

Again referring to FIGURE 1, the honing head is supported by a screw jack generally designated by the numeral 40, the jack having an adjustable screw portion 41 that engages a roller 42 that is mounted on a shaft 43 extending across the ears 12, a lock nut 44 being provided to secure the jack screw 41 in its adjusted position. The jack screw is mounted on a cylindrical shaft or plunger 45 that is subjected to vertical oscillatory movement through table 1 and base 4 by a cam 47 shown in FIGURE 37 that acts on a follower 48 of a bell crank lever 49, one end of which is provided with a heavy counterweight 50, FIGURE 26, suspended from the rod 51, FIGURES 26 and 37, and the other end of which supports the follower 48 that is shown in dotted lines in FIGURE 37. The above-described jack screw and drive mechanism subjects the honing head to a cyclic motion vertically by virtue of the parallel links 9 that connect it to the frame 7. The bearings of the links 9 are preloaded, as shown by the screws 10*a*, FIGURE 1.

The honing head 8 carries the honing tape support and feed mechanism which consists of a cross bar 52, FIGURES 1 and 3, that support a pair of tape reels 53 and 54 from which the tape is fed to a guide roll 55, more clearly shown in FIGURE 8, as mounted on a stud shaft 56 that extends from the honing head 57 that is mounted on the end of the shuttle arm 19. A drive wheel 58, FIGURE 3, is driven by a pinion 59 on the end of shaft 31, FIGURES 3 and 17, the shaft as previously explained being operated by ratchet mechanism shown at 34, FIGURE 17.

The ratchet mechanism is more clearly shown in FIGURE 10 of the drawing. It consists of the ratchet wheel 34 on shaft 33 that is engaged by a pawl 60 mounted on an arm 61 that has an arm 62 which extends in the path of a stop 63 on the upright supporting frame 7. The arm 61 is biased by a coil spring 64 against a stop 61*a* and the pawl is biased by a spring 65. A flat spring 66 holds the ratchet wheel 34 from moving in a counterclockwise direction when pawl 60 is reset. Each time the honing head 8 is subjected to its cyclic vertical movement by the plunger 45, FIGURES 1 and 3, the ratchet wheel will be actuated by the pawl 60 to index the same when lever 62 strikes stop 63, FIGURE 10, which rotates pinion 59 and causes the honing tape feed wheel 58, FIGURE 3, to rotate. The honing tape designated by the numeral 67, FIGURE 3, is supplied in roll form that is mounted on the reel 53. It passes over guide wheel 55 and down to the honing shoe generally designated by the numeral 69 from which it passes upward to the wheel 58 on shaft 70 and thence to the rewind reel 54 which is driven by a garter belt 72 from a pulley 73, FIGURE 3, that rotates with shaft 70. Tension is supplied to the honing tape 67 by rollers 74 and 75 mounted on a cross bar 76 that is held above the guide wheels 55 and 58 by a bolt 77, a spring 78 being disposed between the bolt and link to assert a yielding pressure on rollers 74 and 75 and the tape passing over the guide wheels 55 and 58. This also supplies the traction for the wheel 58 which has a knurled surface 79. FIGURE 7 that engages the face of the tape to pull it forward between successive honing applications of the honing shoe. The details of the honing shoe will be hereinafter explained.

The method of feeding and mounting the work pieces which in the present instance are tapered rollers for roller bearings but which could be wrist pins or any other cylindrical element, will now be described with particular reference to FIGURES 3 and 5. As shown in FIGURE 37, the roller feed and mounting mechanism shown in detail in FIGURE 5 is opposite the honing head and shoe shown in FIGURE 3 of the drawing in which the roller and its drive mechanism is diagrammatically illustrated. FIGURE 25 illustrates the roller to be honed generally designated by the reference character 80. Disposed between a pair of drive wheels 81 and 82 that are mounted on shafts 83 and 84 driven by sheave wheels 85 and 86, respectively, that are driven in the same direction of rotation as indicated by arrows. Shafts 83 and 84 are journaled by anti-friction bearings 87 in journal brackets 88 and 89 mounted on a base 90 that is secured by bolts 91 to the table 1 of the machine frame, FIGURE 21. A key 92 maintains alignment of the base 90 with the honing head which, as shown in FIGURE 3, is also provided with a key 92a for the same purpose.

The journal bracket 89 is adjustably mounted, as shown in FIGURE 22. A stop plate 93, FIGURE 25, is secured by a screw bolt 94 to act as a stop for an adjusting screw 95 by means of which the pinch roll 81 is adjusted in relation to the center of the roller 80 with which it has driving engagement. As shown in FIGURE 22, the bracket 89 is mounted between centers 96 and 97 to adjust its position end-wise by means of adjusting screws 98.

The journal bracket 88 is mounted to be angularly movable by displacement cam 99 that engages the follower 100, FIGURE 21. The follower is mounted in the bearing bracket 88 which is biased by a spring 101 against the cam 99, tension of the spring being adjustable by means of a link 102 having spaced openings 103 that receive a stop pin 104. The spring is fixed on the stationary bearing bracket 89 at 105.

Cam roller 100 is mounted in a block 100a having a shank 100b that fits in bearing bracket 88, FIGURES 21 and 25. Block 100a is held by screw 100c and is adjustable by set screw 100d, FIGURE 25.

The cam 99 is mounted on a spindle 106, FIGURES 5 and 21, that is slidingly mounted in bearings 107 and 108. The end of the spindle 106 is provided with a hardened screw 109 that abuts an adjustable set screw 110 to act as a stop to limit the forward movement of spindle 106.

The other end of the spindle is provided with a bracket 111 and a collar 112 for receiving the rollers 113 and 114 on yoke 115 of a cam actuated lever 116, FIGURES 37 and 39. The rollers 113 and 114 ride against the faces of the members 111 and 112 and reduce friction. Movement of lever 116 causes back and forth movement of the spindle 106 to which is connected a bracket 117 that carries a bushing 117a having a pin (or finger) 118 and a plunger 119 biased by spring 119a, FIGURE 12. Bracket 111 carries a finger 120 having an adjustable screw 121 that engages an arm 122 of the bell crank lever pivoted at 123 to the frame of a feed chute 124. The other arm 125 of the bell crank lever extends forward and has a depending member 126 for engaging the roller bearing 80 to push it to the position from which it is fed to an anvil 127 by which it is supported during the honing operation.

A roller 128 limits the vertical movement of leveling arm 125 but is mounted on a shank portion 129, FIGURE 14, carrying a washer 130 for seating a spring 131 by which the roller 128 can be displaced to allow the lever arm 125 to raise the distance between the diameter of the roller 128 and the pin 129 as viewed in FIGURE 14, to make the receiving station available for inspection and removal of a roller in case the feeding mechanism jams.

The chute 124 has a slotted bore 132 through which the rollers 80 are fed, as shown in FIGURE 5, the manner of feeding the rollers to the bore 132 being no part of the present invention. The rollers 80 to be honed are supplied in end-to-end relation in the inclined bore 132 and as the finger 118, FIGURE 5, moves with the movement of the spindle 106 to the left, the roller 80 drops on a support 133. Upon subsequent forward movement of spindle 106, finger 118 will push the roller 80 to the position on the anvil 127 as shown in FIGURE 5. It is to be noted that when spindle 106 moves to the left, plunger 119 will strike the arm 122, which causes the member 126 to push the roller 80 downward on the support 133 after the finger 118 is fully retracted. Upon subsequent forward movement of spindle 106, the head of screw 121 will contact lever 122 to cause member 126 to raise to permit another roller to pass from the feed chute bore 132 to the top of the finger 118 in the manner shown in FIGURE 5. A modification of the roller mount in its honing position is shown in FIGURES 19 and 20 of the drawing. Instead of the anvil 127, a roller 135 is mounted on a fixed pin 136 in a bracket 137 that replaces the anvil 127, FIGURE 5. In this position the roller 80 to be honed has rolling contact with the roller 135 and the pinch rollers 81 and 82 which are diagrammatically shown. Blocks 133 and 127 are assembled to the base by bolts 138, a key 139, FIGURE 15, maintaining proper alignment of the blocks with the base.

In addition to honing the cylindrical body of the roller 80, the present invention further contemplates honing one end of the roller, as shown in FIGURE 20, for example, wherein the roller 80 is engaged by a honing tape 140 that is pressed against the end face 80a of the roller 80 by a honing shoe 141. This is done while the cylindrical surface of the roller 80 is being honed from the top by the honing mechanism described in connection with FIGURE 3 of the drawing. The end honing mechanism is illustrated in FIGURES 28 through 36 of the drawings in which the numeral 142 represents a reel carrying a roll of honing tape 140 which passes along the guide rolls 144 and 145, the latter being biased by a spring 146 to assert pressure against the honing tape to maintain it in the groove of the guide roll 144.

The honing tape 140 passes over a second guide roll 147 mounted on a bracket 148 that is carried by a sleeve 149 supported on a boss 150, FIGURE 34, extending on the machine base 1, FIGURE 37, member 149 is welded to a collar secured by bolt 151. Extending through the hollow standard or sleeve 149 is a shaft 152 having a key 153 at the end thereof which fits in a slot 154 of a coupling 155 fastened to shaft 155a of a Winsmith speed reducer 156, FIGURE 37, having a ratio of 1 to 10. Shaft 152 carries a garter spring belt pulley 157, FIGURE 34, and a knurled drive wheel 158 which are secured by a key 159 and a nut 160. The knurled wheel 158 advances the honing tape 140 by pressure of a wheel 161, FIGURE 28, mounted on an arm 162 biased by a spring 163 to bear on the honing tape to maintain driving contact of the tape with the knurled drive wheel 158. The tape, after passing around guide wheel 147, passes around the honing shoe which, in this instance, is a stationary cylinder 141 and contacts the end 80a of the roller 80, as shown in FIGURES 28 and 31. Cylinder 141 is shaped to suit end of roller to be honed. After passing around the knurled drive wheel 158, the honing tape is wound on a reel 165, FIGURE 28, which is more clearly shown in FIGURE 35 of the drawings. The reel 165 is mounted on a shaft 166 having a grooved pulley 167 for a garter belt 168 shown in dotted lines, FIGURE 28, that passes around the grooved pulley 157 on shaft 152. As shown in FIGURE 31, the honing shoe 141 is mounted on an adjustable bracket 169 having a screw 170 for adjusting the same relative to the end face 80a of the roller 80 and the slide bracket 169 is locked in adjusted position by a bolt 171, FIGURE 31. The roller 161 that bears against the honing tape 140 to press it against the knurled drive wheel 158 is mounted on the arm 162 that is carried by pin 172 that may be locked in place by a set screw 173, FIGURE 32. The guide wheel 147 is shown in detail in FIGURE 30 as mounted on a pin 174 secured in the bracket 148 by a set screw 175. FIGURE 29 is a cross section taken along the line 29—29 through guide wheel 144 and pressure wheel 145. Guide wheel 144 is mounted on a pin 176 that extends in a plate 177 and is secured therein by a set screw 178. A coil spring 179 asserts yielding pressure through a collar 180 on a friction disc 180a to act as a drag on wheel 144 to keep the tape taut, a knurled nut 182 being provided to adjust the pressure. Wheel 145 is journaled on a pin 183, FIGURE 29, which is secured in a bracket 184 pivoted on a pin 185 extending from the plate 177, the pin being secured by a set screw 186. Spring 146 is secured on pin 187 and on a pin 188 that fits in the plate 177, as is more clearly shown in FIGURE 33 of the drawing, which also shows the reel 142 mounted on the hub 189 of a shaft 190 that is mounted in the plate 177. Plate 177 is mounted on a fixed column 191 having a reduced portion 192 which fits into an opening 193 of a boss 194 that stands up from the machine base 1, as shown in FIGURE 38 of the drawing. Member 191 is provided with a flange 195 which is held by screws 196 to the boss 194 thus constituting the entire end honing mechanism a self-supporting structure.

The honing shoe generally designated by the numeral 69 that hones the cylindrical body of the rollers 80, as shown in FIGURE 3 of the drawing, is shown in detail in FIGURES 40 to 43 of the drawing. It consists of an arm 200, FIGURE 40, mounted on the block 28, FIGURES 3 and 17, having an arrow-shaped end terminating in a tongue 201. The shoe is retained between side plates 202 and 203 joined by a rivet or screw 204. Between these plates is the shoe generally designated by the numeral 205 which has a V groove designated by the numeral 206, as shown in the enlarged view in FIGURE 42 of the drawings. The tips 207 and 208 of the honing shoe are provided with serrations 209, FIGURE 43, that contact the honing tape 67 during the honing operation. The pressure points of the shoe bearing on the roll 80 are offset from the serrations, as shown by the diagonal lines 210 and 211, FIGURE 42. This construction provides for positive and uniform contact of the abrasive tape 67 with the cylindrical surface of the roller 80, as shown in FIGURE 42 of the drawings.

FIGURE 41 is a vertical section through FIGURE 40. It shows the shoe 205 as a floating member, since the pin 212 that holds it is smaller than the bore 213 and the top face of the shoe has clearance angles 214 and 215 which allows a teetering motion of the shoe to render it self-aligning with the work surface to be honed, such as the cylindrical surface of anti-friction roller 80.

The degree of teetering of the shoe is controlled by the amount of clearance 214 and 215. This rocking motion may further be controlled by the reciprocatory motion of the shoe 205 across the surface being honed in the direction transversely of the direction of rotation of the cylindrical body being honed. This type of motion will produce a crown or belly on the finished honed surface which may be useful in controlling the sound or noise of a bearing operating at high speed.

The teetering motion may be subdued by employing a resilient pad (not shown) on the back of the shoe to fill in the space between the shoe 205 and the tongue 201.

The mechanism for coordinating the movements of the roller feed mechanism, the honing head and the honing tape feed mechanisms will now be described in connection with FIGURES 37, 38 and 39 of the drawings. As shown in FIGURES 37 and 39, a cam arm 114 is pivotally mounted at 216 to an arm 217 extending below the base 1 of the machine to which it is bolted. The arm 116 has the bifurcated end that carries the rollers 113 and 114 for engaging the bracket 111 and the collar 112 that carries the spindle 106 and finger 120 of FIGURE 5, the arm 116 is subjected to a rocking motion by a cam 218 mounted on a cam shaft 219, the cam being engaged by a follower 221. As the rise of the cam raises the follower, the arm 116 will retract spindle 106 and when the follower 221 hits the low of the cam an extension arm 222 on arm 116 will strike a stop 223 which is secured to the machine base and which has a screw end 224 with a nut 225 to adjust the end of the stop in relation to arm 222. The arm is biased against the stop 223 by a coil spring 226 attached to a pin 227 and to the arm 222 at 228. The pin 227 is adjustable by a threaded portion 229 and a nut 230 to vary the tension of the spring and hence the pressure of the cam follower 221 on the cam face 220. In operation spring 226 pushes spindle 106 forward and cam 218 retracts it.

The bell crank lever 49 having the follower 48 rides a cam 47 that is mounted on the cam shaft 219 and lever 49 is mounted on a sleeve 236 in bracket 235 bolted to the bottom of the machine base 1. The bell crank lever 49 has an arm 232 from which a counterweight 50 is suspended by a rod 51 that is pivoted at 233 in the arm 232, the counterweight being more clearly shown in FIGURES 26 and 27 of the drawing. The counterweight functions to partially counter-balance the honing head 8 supported on the parallel links 9 shown in FIGURE 1 of the drawings, so that a smooth cyclic movement of the honing head results from the follower 48 riding cam 47 while sufficient weight is left on tape to hone the roller 80. Nut 44, FIGURE 3, acts as a stop.

As shown in FIGURE 38, a pair of plugs 231 extend through the bracket 235 secured underneath the base 1 and as shown in FIGURE 38, the plugs support the sleeve 236 which is rocked by a movement of the cam roller 48 riding on the cam 47. This rocking motion is transmitted by an arm 237, FIGURE 37, having a flat end 238 that supports the roller 46 which operates the cylindrical shaft 45 that carries the jack screw 41 that lifts the honing head, as shown in FIGURE 1 of the drawings. Attached to the base 1 is a spring anchor 239 connected by a spring 240 to the arm 241 that carries a pawl 242 operating a ratchet wheel 243 attached to the input shaft of the Winsmith speed reducer 156. Arm 241 is pivoted at 244 to a bracket 245 that extends from below the base 1 to which it is bolted. As the arm 237 is subjected to rocking motion, arm 241 operates the pawl to rotate the speed reducer which, in turn, rotates the coupling 155, FIGURES 34 and 37, at one-tenth the speed of the wheel 243. The pawl is biased against the teeth of the ratchet wheel by a spring 247 secured to an extension 248 on the arm 241.

Referring to FIGURES 28 to 32 of the drawing, rotation of the socket member 246 rotates the feed wheel 158, FIGURE 28, to advance the honing tape in increments for each cyclic movement of the honing head, which means for each application of the honing tape to the end face 80a of the roller 80, as shown in FIGURE 28. Since, as shown in FIGURE 20, only one-half of the honing tape 140 is applied to the end face 80a of the roller 80 during the honing operation so that after the entire roll of tape has been passed from the roll 142 to the reel 165, it can be reversed and the other side used to hone additional rolls.

As shown in FIGURE 38, a sink drain 249 leads to a sump 250, FIGURE 26 of the drawings. A pump 251 supplies honing fluid to the point of contact of the honing tape with the surface being honed and the fluid drains from the table top through the sink drain 249 to the sump.

As shown in FIGURE 27, the cam hub having the grooves for the cams 47 and 220 is mounted on the shaft 219 which extends from a planetary gear reduction 252 that is driven by a belt 253 connected to a motor 254 by suitable sheave wheels. A motor 255 drives the sheave wheel 25, FIGURE 18 of the drawing, and a motor 256 drives the wheel 257 that is connected by belt or chain to the wheels 85 and 86 of the drive 81 and 82, FIGURE 25 of the drawing. The operation of the above-described honing apparatus is briefly as follows:

With the feed chute 132, FIGURE 5, filled with the rollers to be honed, which are arranged in end-to-end relation with the foremost roller abutting the roller that is beneath the feed finger 126 of the rocker arm 125 and with the roller on anvil 127 disposed between the drive rolls 81 and 82, as shown in FIGURES 3 and 21 of the drawing, the drive motors 256 of the feed mechanism 254 of the cam drive end 255 of the honing head drive are energized to actuate the cam drive, which in turn rocks the level 116 that moves the spindle 106, FIGURE 5, back and forth and at the same time subjects the honing head 8 to cyclic movement vertically to make contact of the honing shoe 69 with the surface of the roller bearing 80. Motor 255 actuates eccentric 23 and causes shuttle bar 20 to oscillate in the honing head 8, which causes the honing shoe 69 to traverse the face of the roller 80 in a direction co-axially with the roller 80. As the cam 47 displaces lever 49, the screw jack 41 will raise the honing head and break contact with the surface of roller 80. At the same time, cam 220 will rock lever arm 114 to retract the spindle 106, FIGURE 5, which carries the bracket 117 in which the pin 118 is mounted. This allows the roller 80 beneath the finger 126 to drop on the block 133 and if it sticks between the end plate 133*a* and the end roller in the feed chute 132, the finger 126 will force it down on the block 133 when plunger 119 strikes the lever arm 122, FIGURE 5.

Movement of the spindle 106 also causes the cam 99 to strike or contact the roller 100, FIGURE 21, to displace the bracket 88, which moves roller 81 away from the bearing roller 80 to allow the latter to drop from the anvil 127 into a receiving receptacle, not shown. When the rocker arm 116, by the action of spring 226, is moved to the right spindle 106 will move to the right and spring 101 will retract bracket 88 and cause the pinch roller 81 to engage the work such as the roller bearing 80 that has been pushed on the anvil 127 by the pin 118. At the same time, a roller bearing 80 will slide from the chute bore 132 to the position on top of pin 118, as shown in FIGURE 5. In this forward movement of spindle 106, cam 47 will have moved to the position where the honing head 8 is lowered by virtue of the screw jack 41 having its follower 46 drop with the cam. The honing shoe 69 will then again be lowered to effect contact of the abrasive surface of the honing tape with the cylindrical body portion of the roller bearing 80, these cyclic steps being repeated for each revolution of the cam shaft 219. As previously explained in connection with FIGURES 1 and 10 of the drawing, each time the honing head 8 is raised, ratchet wheel 34 will be moved by the pawl 60 a distance corresponding to the length of tape that is being consumed for each honing operation. This movement of the wheel 34 rotates shaft 33 that carries the pinion 59, FIGURE 3, that engages wheel 58, FIGURES 3 and 7, that has a knurled surface for grippingly engaging the tape and advancing it. The garter belt 72 rotates reel 54 which winds up the used tape. As previously described in connection with FIGURES 28 through 36 of the drawing, the forward end of the roller bearing 80 being honed is also honed by a separate honing shoe and a separate strand of abrasive tape. The application of the tape to the end of the roller 80 is shown in FIGURE 20 of the drawing wherein the tape 143 is shown in contact with the face 80*a* of the roll 80 with the honing cylinder 141 contacting the smooth side of the tape. This honing section takes place simultaneously with the honing of the cylindrical surface of the roller 80 by means of the mechanism shown in FIGURES 28 to 36 of the drawing.

In FIGURE 28, the tape 143 is shown passing from the supply reel 142 between guide rolls 144 and 145, the latter effecting a drag to maintain tension on the strand between the guide roll 144 and a guide roll 147. The abrasive tape then passes around the honing cylinder 141, contacting the smooth side of the tape. This honing action takes place simultaneously with the honing of the cylindrical surface of the roller 80 by means of the mechanism shown in FIGURES 28 to 36 of the drawing.

In FIGURE 28, the tape 143 is shown passing from the supply reel 142 between guide rolls 144 and 145, the latter effecting a drag to maintain tension on the strand between the guide roll 144 and a guide roll 147. The abrasive tape then passes around the honing cylinder 141, contacts the face 80*a* of the roller 80 and then passes over the feed roll 158 which, as shown in FIGURE 34, has a knurled surface. The roller 161 presses the tape on this knurled surface to cause it to be fed in the direction of the arrow and wound on reel 165 by action of the garter belt 168.

The feed wheel 158, FIGURE 34, moves in increments a distance corresponding to the length of tape worn out by each honing operation, this increment feeding being controlled by the Winsmith speed reducer 156 operating the slotted drive member that is secured to the shaft 155, FIGURE 34. The Winsmith speed reducer, as shown in FIGURE 37, is actuated by a pawl and ratchet mechanism 242 and 243, respectively, that in turn is operated by the bar 241 pivoted on the bracket 245 at 244, which is actuated by the lever arm 237 of the cam mechanism so that the feeding of the honing tape across the face 80*a* of the roller 80 is timed with the cyclic movement of the honing head 8.

It will be noted that the honing shoe 141, FIGURE 28, is not subject to oscillating movement like the honing shoe 69 that acts upon the tape above the cylindrical body of the rollers 80. By merely applying the tape to below the center of the face 80*a*, as shown in FIGURE 20, rotation of the roller 80 when driven by the drive rolls 81 and 82 will effect the honing action.

It is apparent from the above description of the invention that the roller honing machine is fully automatic in its function of feeding cylindrical objects to a honing station applying the abrasive surface of a flexible tape having one side coated with an abrasive material to the cylindrical body of the object and simultaneously applying the abrasive surface of another honing strip to the end of the cylindrical body automatically with all the enumerated steps being coordinated through positively acting mechanism which is nevertheless resilient in that it uses spring power and counterweights which allow displacement of operating parts to prevent damage to the machine in the event some of the objects to be honed become jammed in the feed mechanism or on the honing mount.

The weight of the honing head 8 less the weight of the counterweight 50 determines the pressure on the honing tape. The cyclic movement of the head between successive honing operations is produced by cam 47, FIGURE 37. While this action is positive through the cam mechanism, the honing head has no fixed connection with the actuating mechanism because it rests on the screw jack by roller contact therewith.

The drive rollers mounted on the feed mechanism for revolving the cylindrical objects while they are being honed, while they act as friction drives of the cylindrical object, are resiliently mounted so that they can be displaced in case of a jamming action.

While the invention has been demonstrated as applied to tapered rollers for roller bearings, it is of course evident that it can be used to hone any cylindrical or tapered object such as transmission parts, automobile piston wrist pins and the like by merely modifying the roller supports and the angularity of the honing head for which purpose the graduations are provided thereon.

Although one embodiment of the invention has been herein illustrated and described, it will be evident to those skilled in the art that various modifications may be made in the details of construction without departing from the principles herein set forth.

I claim:

1. Apparatus for honing annular bodies comprising a honing rest for said bodies in alignment with a reciprocating abrasive honing material, a pair of pinch rolls engaging the side of said bodies for rotating the same, a feed mechanism including a loading rod coaxially aligned with said bodies when in honing position on said rest, a stop above said rod, means for feeding said bodies against said stop above and in sliding engagement with said loading rod, a receiving support below said rod on which said bodies fall when said rod is retracted and means for reciprocating said loading rod to push said bodies from said receiving support to said honing rest.

2. Apparatus as set forth in claim 1 having a depending arm above said cylindrical bodies and means for lowering said arm when said loading rod is retracted, to push said annular bodies on top of said receiving support.

3. Apparatus as set forth in claim 1 in which the work consists of tapered rolls for roller bearings and the drive rolls have tapered faces complementary to the faces of said bearing rolls, the drive rolls having their axes parallel with the axis of said bearing rolls to provide true rolling action.

4. Apparatus for feeding, supporting and rotating annular bodies to be honed comprising a honing rest for said bodies in alignment with a reciprocating abrasive honing material, a pair of opposed drive rolls engaging the side of said bodies to rotate the same, one of said rolls being journaled in a hinge bracket mounted on a base, an end abutment for said annular bodies and a loading rod for the other end of said bodies, said loading rod being mounted on a reciprocating spindle having a cam face for engaging a follower on said hinge bracket to separate the same to discharge said annular body on the retraction stroke of said spindle, a variable tension spring holding said hinge bracket follower against said cam, a feed chute centrally of said pair of drive rolls, a stop at the end of said chute for receiving the annular bodies which rest upon said loading rod when the latter is abutting a body being honed, and a lever pivotally mounted to rock with the movement of said spindle and having an arm to push said annular body downward in the path of said loading rod when the latter is in its retracted position and to raise said arm on the forward stroke of said loading arm.

5. Apparatus as set forth in claim 4 in which the reciprocating spindle is retracted by a cam operated lever which in its forward movement is actuated by a spring.

6. In a honing machine, a honing head having an abrasive material mounted for reciprocatory movement, said head being mounted on a frame for angular adjustment therein to vary the pitch of the abrasive surface relative to the surface to be honed and said frame being mounted by a plurality of parallel links of equal length to provide vertical straight line movement of said head relative to the surface to be honed, a movable support on which said head rests, a weight for said support to counterbalance the weight of said head to regulate the pressure of the abrasive material acting upon said surface to be honed and means for actuating said movable support to raise and lower said head to make and break contact of the abrasive material with the surface being honed.

7. A honing head as set forth in claim 6 in which the abrasive material is a tape passing around a shoe mounted on a shuttle arm with drive means to reciprocate the same, the tape having an abrasive surface exposed for contact with the surface to be honed and means responsive to the raising and lowering movement of said head to move the tape around the shoe a distance to renew the abrasive surface.

8. A honing head as set forth in claim 6 in which the movable support includes a plunger on which the head rests, said plunger having a jack screw for adjusting the position of the abrasive to the surface to be honed, a rocker shaft having an arm on which said plunger rests, a bell crank lever mounted on said rocker shaft having a counter-weight on one arm to counter-balance the weight of the honing head and a cam follower on the other arm, and a rotary cam and drive therefor for actuating said bell crank lever to rock the arm supporting the plunger to raise and lower the honing head each revolution of the cam.

9. A honing head as set forth in claim 6 in which the honing tape is mounted on a reel supported on a shuttle arm extending through the honing head, said shuttle arm having a guide rod with a gear wheel at one end for rotating the tape reel to feed the tape and the end of said guide rod having a ratchet mechanism for engagement with a pawl actuated by a stop on the frame supporting the honing head to subject the tape feeding gear to angular movement in response to cyclic vertical movement of the honing head.

10. In a honing machine a honing rest for supporting annular bodies to be honed, drive rolls for rotating said bodies, feed mechanism for feeding said bodies to said honing rest and means for ejecting said bodies when they are honed, a honing head adjacent said honing rest and feed mechanism having a honing shoe in alignment with said honing rest, an abrasive honing tape passing around the end of said honing shoe with the abrasive surface exposed to the bodies being honed, said honing head being mounted for straight line vertical movement to make contact of the abrasive surface with the body being honed, said honing head being counter-balanced to regulate the honing pressure asserted by the weight of the head acting on the abrasive material, a cam drive for actuating said honing head to raise and lower the same and a cam drive for actuating said feed mechanism for feeding the annular bodies to be honed to the honing rest, said cam drives being coordinated by a single planetary gear drive and being mounted on a common driven shaft.

11. In a machine for honing bearing rollers, the combination with a combined roller support, roller feed, and roller drive assembled as a unit and a honing head adapted for oscillatory movement all mounted on a supporting table, and a separate roller end honing mechanism mounted on said table below said honing head adjacent said unit, said honing head having a shuttle bar with means for supporting abrasive tape material in contact with said roller while subjected to reciprocatory movement transversely of the face of the tape, and said end honing mechanism supporting abrasive material in contact with the end of said bearing roller with the face of the tape at substantially right angles to the face of the shuttle bar tape.

12. Apparatus as set forth in claim 11 in which the end honing mechanism consists of an adjustable support for a honing shoe adjacent the end of the roller rest, a reel supporting a roll of abrasive tape material and combined guide and tension means for feeding the tape between the end of the bearing roller and said shoe with an abrasive surface in contact with the end face of said roller, feed mechanism including means for grippingly engaging the tape and pulling the same from said guide and tension means between the shoe and bearing roller rest and means for coordinating said feed mechanism with said roller bearing feed, and drive and with the oscillatory movement of the honing head, to be operative to renew the abrasive surface during a honing cycle.

13. Apparatus as set forth in claim 11 in which the means for supporting the abrasive tape material is a honing shoe pivotally mounted on an arm to be self-aligning with the surface to be honed.

References Cited in the file of this patent

UNITED STATES PATENTS

| | | |
|---|---|---|
| 1,993,543 | Egger | Mar. 5, 1935 |
| 2,076,601 | Strong | Apr. 13, 1937 |
| 2,270,525 | Johnson | Jan. 20, 1942 |
| 2,406,689 | Indge | Aug. 27, 1946 |
| 2,586,987 | Ortegren | Feb. 26, 1952 |
| 2,646,652 | Blood | July 28, 1953 |
| 2,756,547 | Rippl | July 31, 1956 |